United States Patent
Chen et al.

(10) Patent No.: US 9,228,512 B2
(45) Date of Patent: Jan. 5, 2016

(54) EGR FLOW METERING SYSTEMS AND METHODS

(71) Applicants: Gang Chen, Rochester Hills, MI (US); Hussein Dourra, Bloomfield, MI (US); Gregory T Weber, Commerce, MI (US); Drushan A Mavalankar, Rochester Hills, MI (US)

(72) Inventors: Gang Chen, Rochester Hills, MI (US); Hussein Dourra, Bloomfield, MI (US); Gregory T Weber, Commerce, MI (US); Drushan A Mavalankar, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 310 days.

(21) Appl. No.: 14/043,289

(22) Filed: Oct. 1, 2013

(65) Prior Publication Data

US 2015/0090236 A1    Apr. 2, 2015

(51) Int. Cl.
  *F02M 25/07*   (2006.01)
  *F02B 47/08*   (2006.01)
  *F02D 41/00*   (2006.01)

(52) U.S. Cl.
  CPC ........ *F02D 41/0077* (2013.01); *F02D 41/0065* (2013.01); *F02M 25/0754* (2013.01); *F02D 41/0072* (2013.01); *F02M 25/0731* (2013.01)

(58) Field of Classification Search
  CPC ..... F02B 47/08; F02D 41/00; F02D 41/0072; F02D 41/0075; F02D 41/0077; F02M 25/07; F02M 25/0761; F02M 25/077; F01N 2560/02; F01N 2560/07

USPC ............ 123/568.12, 568.16, 568.18, 568.21, 123/568.26; 701/103, 104, 108, 114, 115; 60/605.2
  See application file for complete search history.

(56) References Cited

U.S. PATENT DOCUMENTS

| | | | | |
|---|---|---|---|---|
| 5,803,048 A * | 9/1998 | Yano | ............. | F02D 31/005 123/443 |
| 7,085,647 B1 * | 8/2006 | Prucka | ............. | F02D 41/0087 701/114 |
| 7,243,019 B2 * | 7/2007 | McLain | ............. | F02D 41/0077 123/568.21 |
| 7,810,476 B2 * | 10/2010 | Wang | ............. | F02D 35/025 123/568.16 |
| 2005/0039439 A1 * | 2/2005 | Kitahara | ............. | F02D 41/0057 60/274 |
| 2006/0070605 A1 * | 4/2006 | Akihisa | ............. | F02D 13/0234 123/478 |
| 2009/0063023 A1 * | 3/2009 | Nagae | ............. | F01N 3/021 701/108 |
| 2010/0179745 A1 * | 7/2010 | Nakayama | ............. | F02D 41/0072 701/108 |
| 2010/0211294 A1 * | 8/2010 | Soejima | ............. | F02D 11/105 701/108 |

* cited by examiner

*Primary Examiner* — John Kwon
*Assistant Examiner* — Johnny H Hoang
(74) *Attorney, Agent, or Firm* — Ralph E. Smith (57) ABSTRACT

Methods and systems for metering at least one EGR valve to a position determined to pass a desired EGR flow for a given set of engine characteristics. The methods include determining the EGR valve position based on pipe flow characteristics, or determining the EGR valve position based on pipe flow characteristics when differential pressure across the EGR valve is less than a pressure threshold.

20 Claims, 7 Drawing Sheets

EGR FLOW METERING SYSTEMS AND METHODS

FIELD

The present invention relates to engine control, specifically to improved EGR flow metering.

BACKGROUND

Presently, $NO_x$, as well as other engine exhaust emissions, can be reduced through Exhaust Gas Recirculation (EGR) where engine exhaust gas is recirculated and mixed with intake air into the engine intake manifold. Cooled EGR (CEGR) systems may be used to increase engine fuel efficiency at high engine loads. However, the accuracy of present EGR flow metering techniques based on the pressure differential across the EGR valve significantly decreases as the pressure differential decreases, such as during high load and relatively low engine speed; this means that present methods are insufficient for metering CEGR flow. Accordingly, there is a need and desire for improved EGR metering methods and systems that incorporate them.

SUMMARY

In various aspects, the present disclosure provides improved methods of setting at least one exhaust gas recirculation (EGR) valve position for mixing EGR with intake air in an engine system including an engine, an EGR system including EGR piping, and at least one EGR valve and an air intake system including air intake piping, along with systems that perform the methods. The method includes, in one aspect, determining by a controller operating characteristics of the engine system, determining by a controller a desired EGR flow ratio (which can also be referred to as an EGR fraction) based on the operating characteristics of the engine system, determining by the controller an EGR valve position, and configuring the EGR valve position to the determined position.

One such embodiment includes determining the EGR valve position based on pipe flow characteristics and may include determining a relationship between a desired EGR flow ratio and an EGR flow loss factor, piping friction factors, along with piping diameter multipliers.

In another embodiment, the EGR valve position is determined by relating an EGR effective flow area to differential pressure characteristics. The method may include determining the EGR valve position based on a function dependent on exhaust temperature and a function dependent on a pressure ratio of intake manifold pressure and exhaust pressure. In one example, the pressure characteristics are used to determine EGR valve position when differential pressures are above a first threshold pressure, and pipe flow characteristics are used to determine the EGR valve position when differential pressure are below the first threshold pressure.

Further areas of applicability of the present disclosure will become apparent from the detailed description provided hereinafter. It should be understood that the detail description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

In one form, the present disclosure provides a method of metering CEGR flow in an internal combustion engine. EGR is useful in the control of $NO_x$, as well as other engine exhaust emissions. $NO_x$ emissions are reduced because the EGR decreases the combustion temperature and reduces pumping losses through the combined effect of displacing intake air and decreasing the charge density through heating. CEGR systems, where the EGR is cooled prior to being mixed with the intake air may be used to increase fuel efficiency at high loads. The addition of CEGR substantially reduces the knock tendency of the engine, which results in the ability to increase the engine effective compression ratio, advance combustion phasing, and improve the combustion cycle efficiency. Furthermore, CEGR increases the specific heat capacity of the fuel-air mixture, which when combined with advanced combustion, results in a substantial decrease in combustion temperatures and the need for a rich mixture, thus increasing fuel efficiency. An EGR valve can be used to mix CEGR with the intake air to obtain a desired EGR flow. However, metering the EGR flow at low differential pressure can be inaccurate, leading to a less optimized EGR/air mixture.

Thus, as described below in more detail and in accordance with the disclosed exemplary principles, an engine system's operating characteristics can be evaluated to determine a desired EGR flow ratio, which can also be referred to as an EGR fraction, based on the operating characteristics. After the system determines the desired EGR flow ratio, the system can determine an EGR flow loss factor corresponding to the EGR flow ratio using, for example, a relationship between the desired EGR flow ratio and pipe flow characteristics. Then, the system can determine an EGR valve position based on the EGR flow loss factor and configures the EGR valve to the determined or similar EGR valve position.

Figure 1:
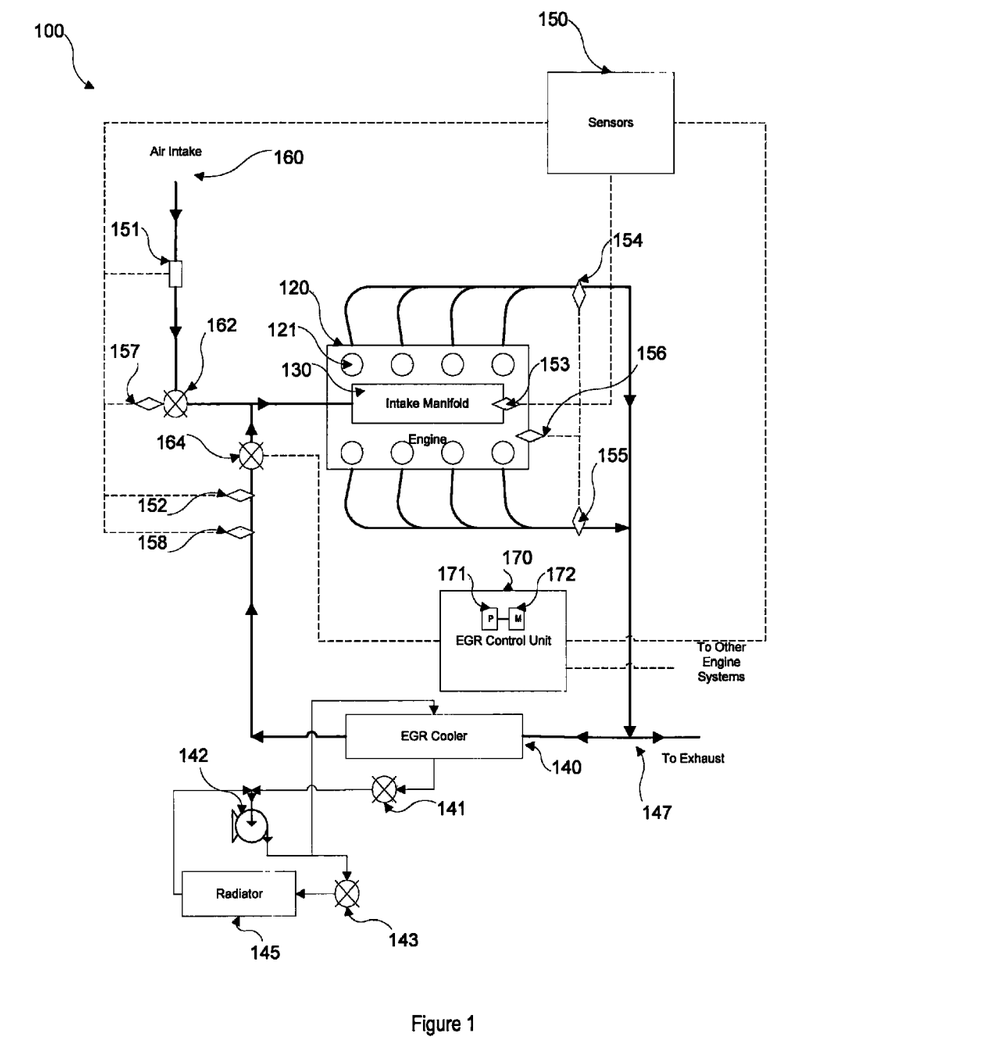
FIG. 1 is a schematic of an example engine system including an EGR system in accordance with the present disclosure.

FIG. 1. illustrates an exemplary engine system 100 comprising an engine 120, air intake 160, intake manifold 130, air intake valve (or throttle) 162, EGR cooler 140, EGR valve 164 and a plurality of sensors 150. A single system sensor 150 block is shown, but it should be understood that sensor information may come from multiple independent sensors throughout the system including additional sensors or signals not shown. The sensors 150 may include at least an air intake air flow sensor 151, EGR temperature sensor 152, intake manifold pressure sensor 153, exhaust oxygen sensor 154, exhaust pressure sensor 155, engine rotation speed sensor 156, an air intake valve position sensor 157, and an EGR pressure sensor 158 (such as an EGR valve inlet pressure sensor). Sensors 151-158 are shown to illustrate the location of individual sensors within engine system 100 and are together represented as sensors 150. It should be appreciated that several of the sensors 151-158 shown in this example may not be included in other systems as their values can be determined based on other engine operating characteristics. For example, exhaust pressure sensor 155 may be omitted and the value of exhaust pressure may be calculated using information obtained from air flow rate sensor 151, engine rotation speed sensor 156, and a previously determined intake manifold EGR fraction (percentage of exhaust/air mixture entering the intake manifold 130 that is EGR). Similarly, EGR pressure sensor 158 may be omitted and the value of EGR pressure (such as EGR valve inlet pressure) may be calculated using information obtained from manifold pressure sensor 153, exhaust pressure, and a previously determined EGR flow.

The EGR cooler 140 can be designed as a heat exchanger such that a portion of hot exhaust from engine 120 that flows through junction 147 and into EGR cooler 140 releases heat to the EGR cooler 140 such that cooled recirculated exhaust flows from the EGR cooler 140 to the EGR valve 164. The remaining portion of the non-recirculated hot exhaust is discharged through an exhaust system (not shown). The EGR cooler may be any heat exchanger with sufficient heat exchanging capabilities for the rated EGR cooling needs for a particular application. In one example, EGR cooler 140 is liquid cooled and includes a radiator 145, pump 142, radiator control valve 143, which may be thermally controlled to regulate the cooling of the EGR cooler 140, and an EGR coolant control valve 141. In another example, the EGR cooler 140 may use engine coolant to cool the EGR. In that case, a separate pump 142 and radiator 145 could be excluded.

Air can be drawn into engine 120 through air intake 160, pass through air intake valve 162 where it can be mixed with cooled EGR exiting EGR valve 164. The air/EGR mixture then enters intake manifold 130 where it is drawn into individual combustion cylinders 121 during normal operation. The ratio of EGR to air that enters the intake manifold is determined by how open the EGR valve is for a given amount of air passing through air intake valve 162. Although only one air intake valve 162 and one EGR valve 164 are shown, it should be understood that additional air intake valves 162 or EGR valves 164 may be included such that the additional valves may provide a parallel flow path to reach intake manifold 130.

The engine system 100 may further comprise an EGR control unit 170. The EGR control unit 170 comprises a processor (P) 171 connected to a memory (M) 172, but it should be understood that EGR control unit 170 may comprise any programmable controller configured as described herein. In one example, the EGR control unit 170 includes connections from the sensors 150. In another example, the EGR control unit 170 includes connections from other vehicle status systems. EGR control unit 170 may be configured to send control signals to EGR valve 164 such that the position of EGR valve 164 may change in response to EGR control unit 170 signals. For example, EGR control unit 170 can control EGR valve 164 to move in a more open direction causing more EGR to mix with air and thus result in a higher intake manifold EGR fraction (the ratio of EGR to air entering the intake manifold 130). In another example, the EGR control unit 170 can control the EGR valve 164 to move in a more closed direction causing less EGR to mix with air.

Figure 1A:
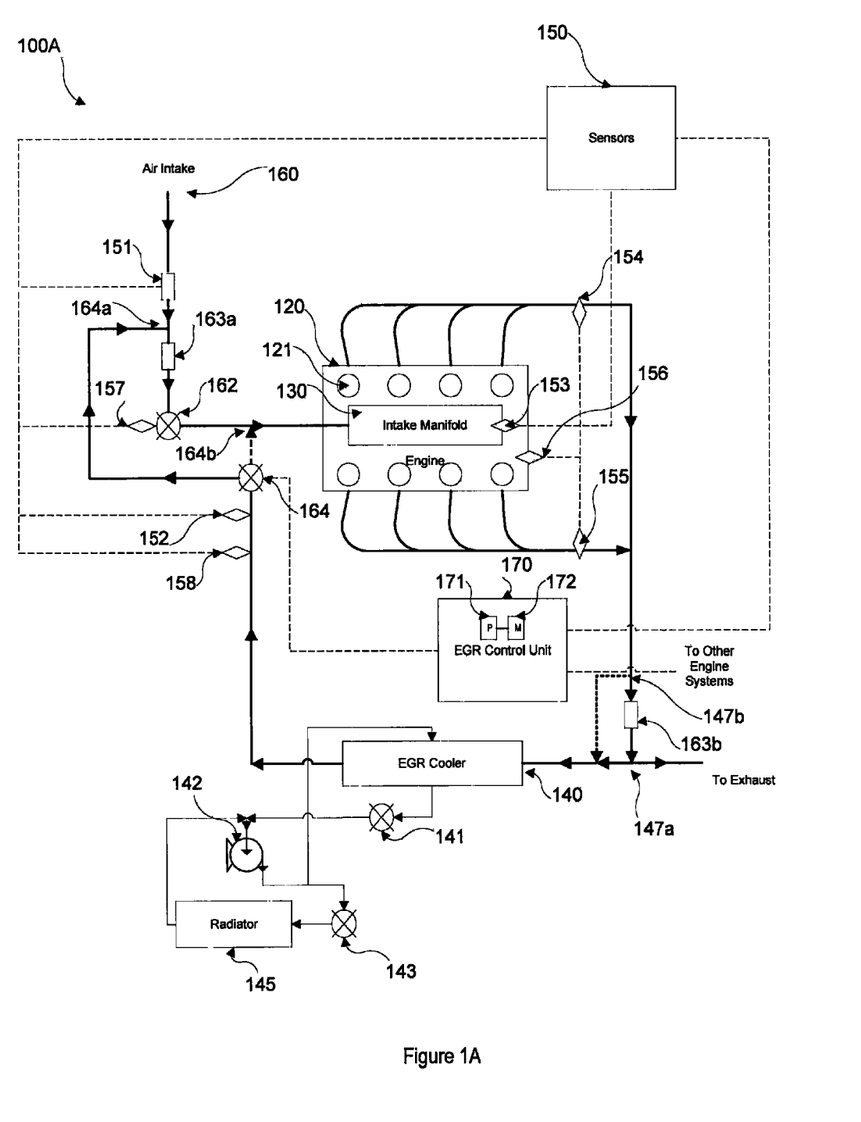
FIG. 1A is a schematic of an example engine system including an EGR system in accordance with the present disclosure.

FIG. 1 illustrates a nominal pressure EGR loop for a naturally aspirated engine. In another embodiment, engine system 100 may be configured with a high or low pressure EGR loop for a forced induction engine (e.g. turbocharged engine). For example, FIG. 1A illustrates another engine system 100A containing similar components with like reference numbers. However, the cooled EGR flowing downstream from EGR valve 164 may be introduced upstream 164a of a turbocharger compressor 163a which is mechanically tied (not shown) to a turbocharger turbine 163b (low pressure loop) or, alternatively, directly 164b into the intake manifold (high pressure loop) shown as the dashed line near 164b. In a low pressure loop, the EGR may flow from downstream 147a of turbocharger turbine 163b. In a high pressure loop, the EGR may flow from upstream 147b of turbocharger turbine 163b shown as the dashed line near 147a instead of flowing from 147a.

Figure 2:
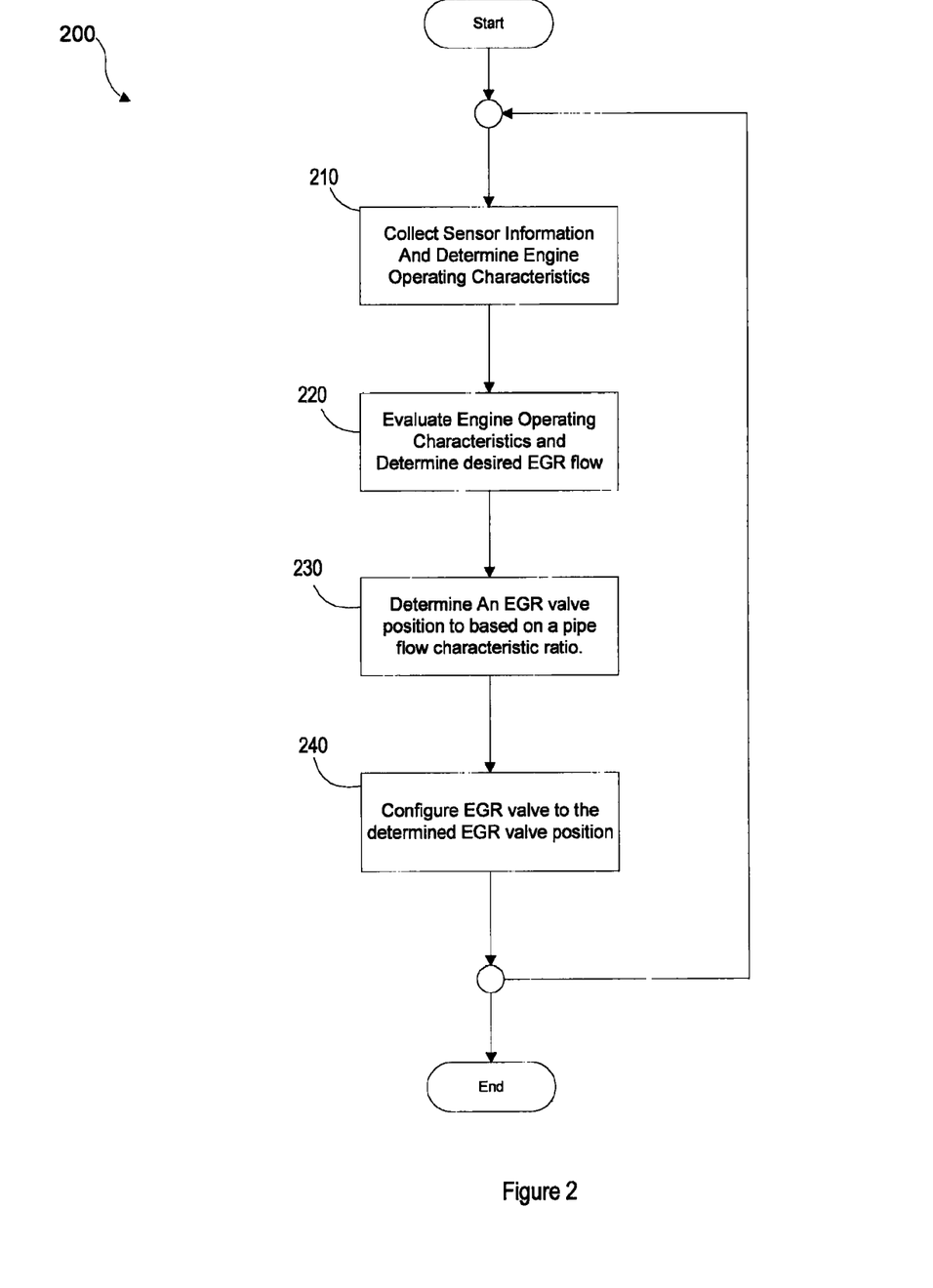
FIG. 2 is a flow diagram illustrating a method of metering EGR flow according to the principles of the present disclosure.

FIG. 2 shows a flowchart of a method 200 performed by the EGR control unit 170 for metering the position of EGR valve 164. In a desired embodiment, the method 200 is implemented in software, stored in a computer readable medium, which could be a random access memory (RAM) device, non-volatile random access memory (NVRAM) device, or a read-only memory (ROM) device and executed by the EGR control unit 170, which may be or include a processor, or other suitable controller within the system 100 of FIG. 1. Moreover, the computer readable medium can be part of the EGR control unit 170 or external to the EGR control unit 170. The method 200 can be performed continuously or periodically as part of background or normal processing of the EGR control unit 170.

At step 210, the engine system's 100 operating characteristics can be determined by collecting information from the sensors 150 and/or from other engine systems. The engine operating characteristics may include operational information such as exhaust temperature, exhaust pressure, EGR temperature, EGR pressure, intake manifold pressure, intake airflow, engine rotation speed, engine throttle position, air intake valve position, a pressure differential across at least one EGR valve, and an intake manifold EGR fraction. The engine operating characteristics may further include a desired air flow rate and a demanded torque requested. As discussed above, in one example some engine characteristics are not measured directly, but are determined based on other engine operating characteristics or passed to the EGR control unit 170 from other engine systems. For example, exhaust temperature may be calculated based on air flow rate, engine rotation speed, and a previously determined intake manifold EGR fraction. As another example, EGR pressure may be calculated based on previously determined EGR flow and exhaust pressure.

At step 220, the engine operating characteristics are evaluated and a desired EGR flow ratio can be determined based on the engine operating characteristics determined at step 210. The desired EGR flow ratio for a given set of engine operating characteristics can be predetermined and pre-programmed into the EGR control unit 170 to obtain the desired benefits of EGR for a given set of engine characteristics. At step 230, discussed in more detail below, the EGR valve position can be determined based on pipe flow characteristics, for example, a pipe flow characteristic ratio. At step 240, the EGR valve 164 is configured to the position determined in step 230. The method 200 may then be repeated.

At step 230, the EGR valve position may be determined based on a relationship between the desired EGR flow ratio on a first side of an equation (EQN 1) to a pipe flow characteristic ratio on a second side of EQN 1. In this case, the pipe flow characteristic ratio depends on an EGR flow loss factor which varies in response to the flow area of the EGR valve 164. Therefore, if the desired EGR flow ratio is known, the flow area of the EGR valve 164 corresponding to an EGR valve 164 position can be determined.

The EGR flow ratio may include the flow rate of intake air ($Q_A$) over a desired flow rate of cooled EGR ($Q_{EGR}$), which is determined at step 220. $Q_A$ may be a measured air flow rate, or a desired air flow rate. The pipe flow characteristic ratio may include a ratio of an EGR system characteristic as a function of at least one EGR flow loss factor ($K_{EGR}$) to an air intake system characteristic. Therefore, in one example, EQN 1 is:

$$\frac{Q_A}{Q_{EGR}} = \frac{\text{EGR\_Char}(K_{EGR})}{\text{AirIntake\_Char}} \qquad \text{EQN 1}$$

It should be understood that additional system constants may be included on either side of EQN 1 depending on the geometry, material, surface finish etc. characteristics of the system under consideration.

In one example, the EGR system characteristic as a function of at least one EGR flow loss factor EGR_Char($K_{EGR}$) includes the square root of the sum of an EGR piping friction factor ($F_{EGR}$) and a related EGR flow loss factor for each EGR valve 164. Thus, if there were only one EGR valve 164, the EGR system characteristic may be represented as:

$$\sqrt{F_{EGR}+K_{EGR}}$$

And if there are multiple EGR valves 164 the EGR system characteristic may be represented as:

$$\sqrt{F_{EGR}+\Sigma K_{EGR}}$$

It should be understood that additional factors may be included under the square root.

The EGR flow loss factor ($K_{EGR}$) may further depend on the flow area ($A_{EGR}$) of the EGR valve 164. Thus, by solving EQN1 for $A_{EGR}$, an EGR valve position can be determined. In one example, $K_{EGR}$ may depend on a ratio of the flow area of the EGR valve 164 ($A_{EGR}$) to the EGR system piping cross sectional area ($A_{EGR\_pipe}$), which would be a known constant. In another example, $K_{EGR}$ may be further defined as:

$$K_{EGR} = \left(1 - \frac{A_{EGR}}{A_{EGR\_pipe}}\right)^2$$

The air intake characteristic may be determined using constants based on the design of the air intake system as well as at least one air intake loss factor $K_{INT}$ for each air intake valve 162 included in engine system 100. For example, the air intake characteristic may include the square root of the sum of all air intake loss factors $\Sigma K_{INT}$ for each air intake valve 162 and an air intake piping friction factor ($F_{AIR}$). Thus, if there were only one air intake valve 162, the air intake system characteristic may be represented as:

$$\sqrt{F_{AIR}+K_{INT}}$$

And if there are multiple air intake valves 162 the air intake system characteristic may be represented as:

$$\sqrt{F_{AIR}+\Sigma K_{INT}}$$

It should be understood that additional factors may be included under the square root.

The air intake loss factor ($K_{INT}$) may further depend on the flow area ($A_{IValve}$) of the air intake valve 162 which can be determined based on the desired air flow rate, or from other indications such as throttle position. In one example, $K_{INT}$ may depend on a ratio of the flow area of the air intake valve 162 ($A_{IValve}$) to the air intake system piping cross sectional area ($A_{Ipipe}$), which would be a known constant. In another example, $K_{INT}$ may be defined as:

$$K_{INT} = \left(1 - \frac{A_{IValve}}{A_{Ipipe}}\right)^2$$

The friction factors ($F_{INT}$, $F_{EGR}$) for the air intake system and the EGR system can be based on the respective system design characteristics. For example, each friction factor can depend on at least one of the respective system piping lengths ($L_{INT}$, $L_{EGR}$), system piping diameters ($D_{INT}$, $D_{EGR}$), and system piping friction coefficients ($f_{INT}$, $f_{EGR}$), which can be based on the piping material and system design. Each of L, D, and $f$ can be an average or weighted value for the respective piping systems and the friction coefficients ($f_{INT}$, $f_{EGR}$) as well as the friction factors ($F_{INT}$, $F_{EGR}$) as a whole can be determined empirically based on the particular piping systems used or estimated based on known materials.

Therefore, in one example, the relationship between the desired EGR flow ratio to the pipe flow characteristic ratio can be represented by an updated EQN 1 as follows:

$$\frac{Q_A}{Q_{EGR}} = \frac{\sqrt{f_{EGR}L_{EGR}/D_{EGR} + \Sigma K_{EGR}}}{\sqrt{f_{INT}L_{INT}/D_{INT} + \Sigma K_{INT}}} \qquad \text{EQN 1}$$

As stated above, additional system constants may be included on either side of EQN 1. For example, EQN 1 may include a piping diameter multiplier depending on each of the respective air intake and EGR system piping diameters ($D_{INT}$, $D_{EGR}$). In one embodiment, the piping diameter multiplier is squared further modifying EQN 1 as follows:

$$\frac{Q_A}{Q_{EGR}} = \left(\frac{D_{INT}}{D_{EGR}}\right)^2 \frac{\sqrt{f_{EGR}L_{EGR}/D_{EGR} + \Sigma K_{EGR}}}{\sqrt{f_{INT}L_{INT}/D_{INT} + \Sigma K_{INT}}} \qquad \text{EQN 1}$$

After determining the engine operating characteristics in step 210, and determining a desired EGR flow in step 220, at step 230, the flow area ($A_{Valve}$) of the EGR valve 164 (or multiple valves) can be determined and correlated to a predetermined opened position based on the particular valve characteristics.

It should be understood that the calculation can be solved in either direction, i.e. to determine desired EGR valve 164 position (as shown) or to estimate EGR flow (reverse direction). For example, if intake air flow and the position of the EGR valve 164 is known, EGR flow at current conditions can be estimated. However in this embodiment, as well additional embodiments, the determination of desired EGR valve position corresponding to desired EGR flow is shown.

Figure 3:
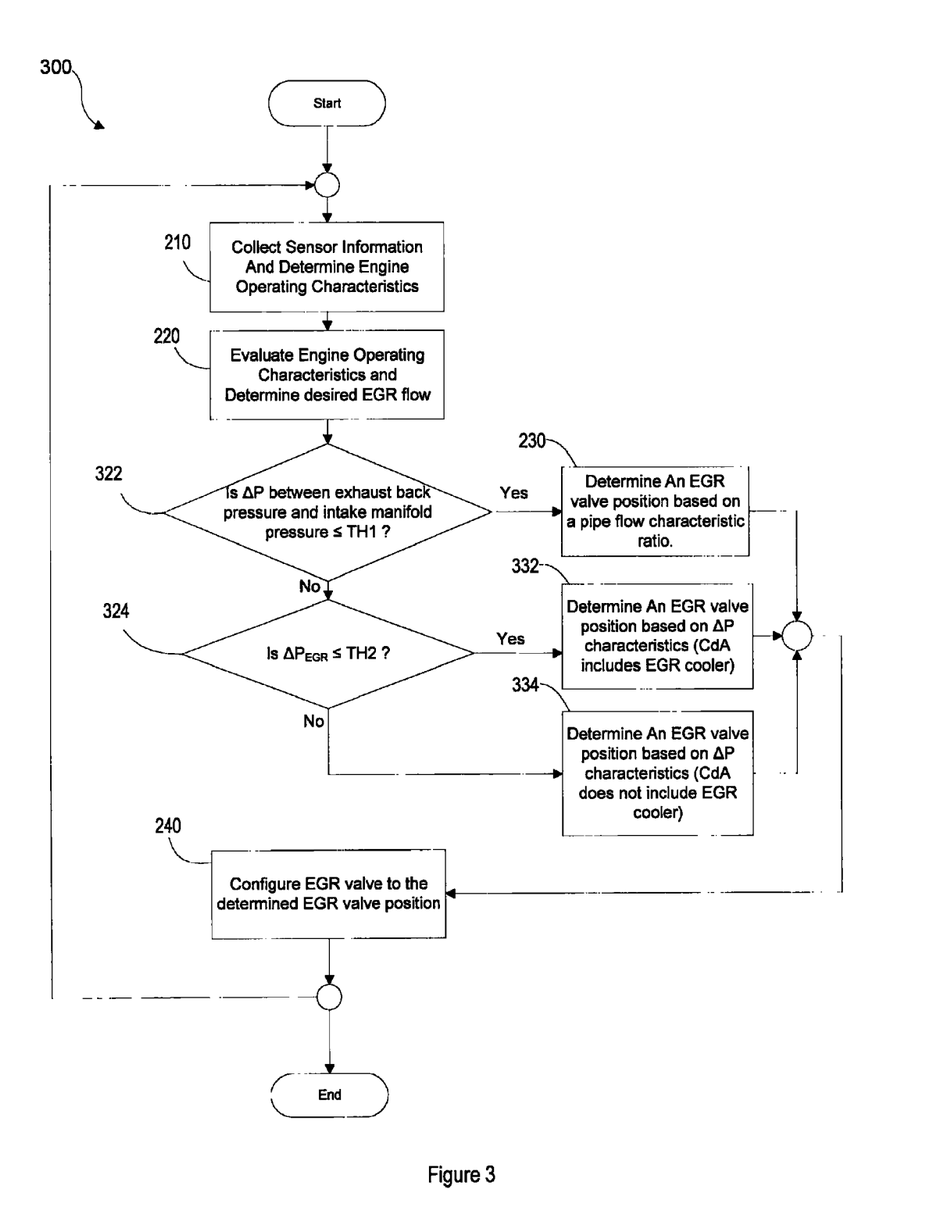
FIG. 3 is a flow diagram illustrating a method of metering EGR flow according to the principles of the present disclosure.
Figure 4:
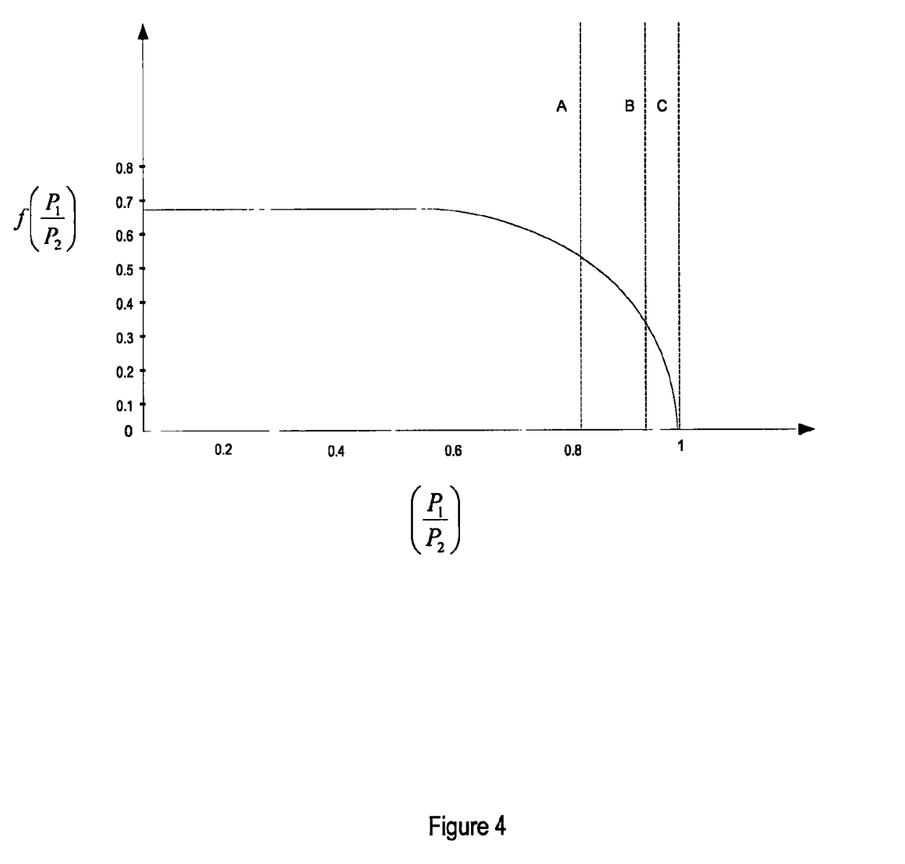
FIG. 4 is a graph showing various regions of operation according to the principles of the present disclosure.
Figure 5:
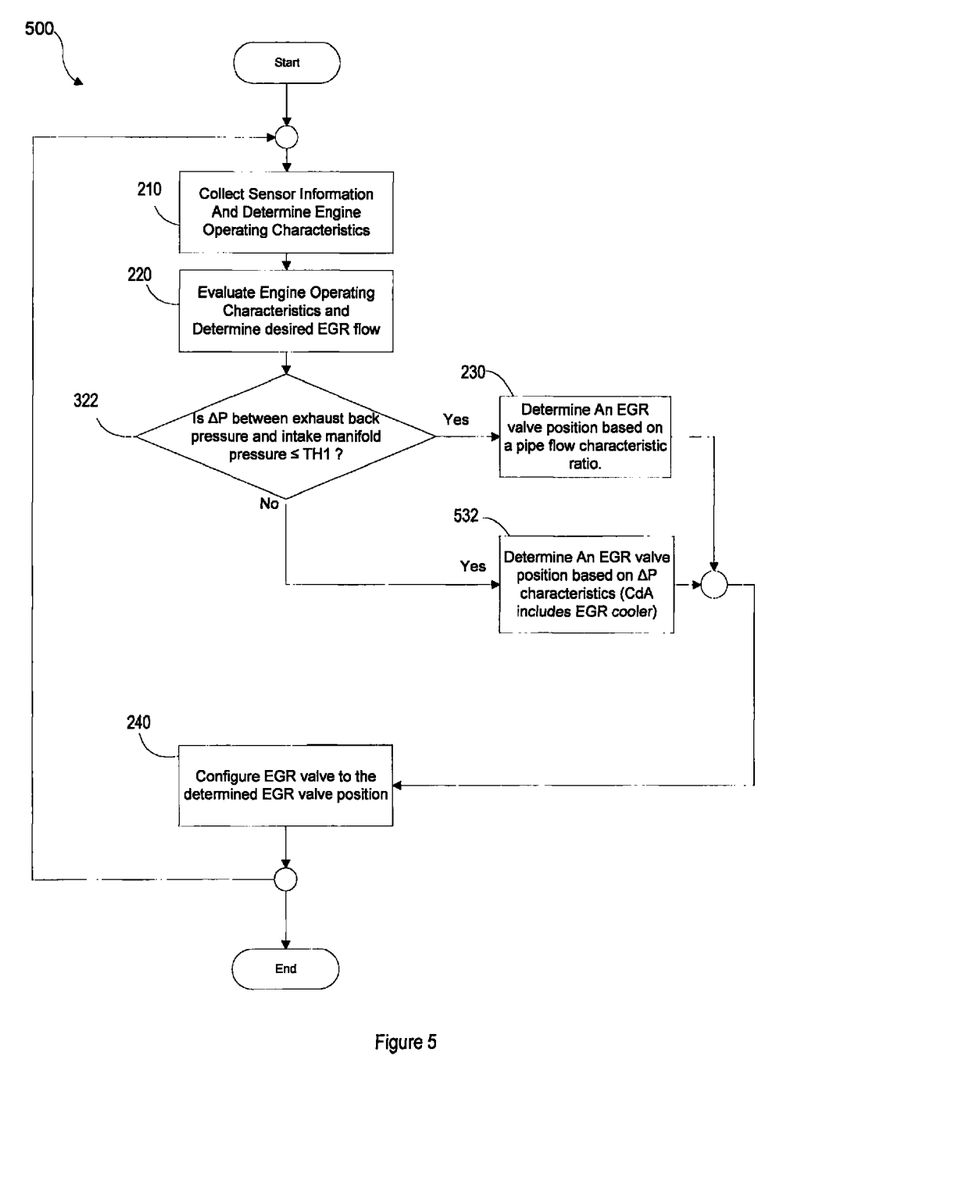
FIG. 5 is a flow diagram illustrating a method of metering EGR flow according to the principles of the present disclosure.

FIG. 3 shows a flowchart of another example method 300 performed by the EGR control unit 170 for metering the position of EGR valve 164. Method 300 also helps improve EGR flow metering techniques. As the air intake valve 162 is opened, pressure in the intake manifold 130 rises and the pressure differential across the EGR valve 164 decreases. This decrease in pressure, as discussed above, can lower the metering accuracy. For example, the flow area of a valve for a desired mass flow rate can be determined based on an inverse relationship to a function $f(P_1/P_2)$ dependent on the pressure ratio across the valve ($P_1/P_2$). FIG. 4 shows a representative graph of the relationship between $f(P_1/P_2)$ and the pressure ratio ($P_1/P_2$). The accuracy of valve metering worsens in region B of the FIG. 4, as compared to region A, when the magnitude of the restriction caused by EGR cooler 140 is almost equal to, or greater than the restriction caused by EGR valve 164. This means the control point for EGR flow may change from EGR valve 164 to upstream of the EGR cooler 140. The accuracy of valve metering worsens even further in region C of FIG. 4 as the pressure ratio ($P_1/P_2$) approaches 1, i.e. as the pressure differential across a valve approaches 0. Thus, method 300 incorporates multiple pressure zones to determine an accurate EGR effective flow area for each pressure region.

Steps 210, 220, 230, and 240 are similar to those of like reference numbers described in reference to method 200 above. However, unlike method 200, method 300 includes alternative EGR valve 164 position determination steps 230, 332, and 334, which will be followed depending on the evaluation step 220 and the results of steps 322 and 324.

At step 322, if the pressure differential ($\Delta P$) between the exhaust pressure and the intake manifold pressure (i.e. the absolute difference between the two) is less than or equal to a first threshold pressure (TH1), the EGR valve 164 metering method is determined based on operating in region C (FIG. 4) and the EGR valve 164 position is determined at step 230 based on a pipe flow characteristic ratio. This is the same determination described with reference to method 200. Determining the EGR valve position based on a pipe flow characteristic ratio is advantageous below TH1 as compared to being based on pressure differential characteristics, because the pipe flow characteristic ratio is more accurate at lower pressure differentials. For example, TH1 may be about 5 kPa, however the determination TH1 which is effectively the boundary between regions B and C (FIG. 4) will differ based on individual system design and can be determined by a person skilled in the art.

If the pressure differential ($\Delta P$) between the exhaust pressure and the intake manifold pressure is greater than a first threshold pressure (TH1), then, at step 324 it is determined whether the $\Delta P$ across the EGR valve 164 is less than or equal to a second threshold pressure (TH2). If so, the EGR valve 164 metering method is determined based on operating in region B (FIG. 4) and the control point for EGR flow has changed from EGR valve 164 to upstream of the EGR cooler 140. TH2 can be determined for an individual system design based on when the magnitude of the restriction caused by EGR cooler 140 is almost equal to, or greater than the restriction caused by EGR valve. Then, the EGR valve 164 position is determined at step 332 based on a relationship between an EGR effective flow area (CdA) on a first side of an equation (EQN 2) to a pressure characteristic on a second side of EQN 2. The effective flow area (CdA) is the product of a discharge coefficient (Cd) and an flow area (A) of the EGR valve 164 and may be empirically correlated to EGR valve 164 position based on a specific EGR system design as well as vary with respect to EGR system pressure. Therefore each system design may have a series of EGR valve 164 positions for a given effective flow area (CdA) at varying $\Delta P$'s. Thus for a determined effective flow area (CdA) at a given $\Delta P$, an EGR valve 164 position can be determined.

In one example, the pressure characteristic relates the desired mass flow rate of EGR ($\dot{m}_{egr}$) to a first function ($f_1(T_{exh})$) dependent on the exhaust temperature, a second function $$\left(f_2\left(\frac{P_{int}}{P_{exh}}\right)\right)$$

dependent on the ratio of the intake manifold pressure ($P_{int}$) to the exhaust pressure ($P_{exh}$), and the exhaust pressure ($P_{exh}$). Therefore, in one example, EQN 2 is:

$$CdA = \frac{\dot{m}_{egr}}{P_{Exh} f_1(T_{Exh}) f_2\left(\frac{P_{int}}{P_{Exh}}\right)} \quad \text{EQN 2}$$

$f_1(T_{exh})$ may depend on the inverse of the square root of $T_{exh}$. As one example, $f_1(T_{exh})$ may be:

$$f_1 = \frac{1}{\sqrt{R_{exh} T_{exh}}}$$

where $R_{exh}$ is the gas constant for exhaust gases.

$$f_2\left(\frac{P_{int}}{P_{exh}}\right)$$

may further depend on whether or not a choked flow condition would be calculated (i.e., whether a further reduction in the downstream pressure of the EGR valve 164 would provide no increase in mass flow). A choked flow condition would occur below the critical pressure ratio $$\left(\frac{P_{int}}{P_{exh}}\right)_{critical}$$

where:

$$\left(\frac{P_{int}}{P_{exh}}\right)_{critical} = \left(\frac{2}{\gamma+1}\right)^{\frac{\gamma}{(\gamma-1)}}$$

and $\gamma$ is the ratio of specific heats $$\left(\frac{C_p}{C_v}\right)$$

of the cooled EGR resulting in a $$\left(\frac{P_{int}}{P_{exh}}\right)_{critical}$$

in one example being approximately 0.528. Therefore in one example:

$$f_2\left(\frac{P_{int}}{P_{exh}}\right) = \gamma^{\frac{1}{2}} \left(\frac{2}{\gamma+1}\right)^{\left(\frac{\gamma+1}{2(\gamma-1)}\right)}, \text{ when } \left(\frac{P_{int}}{P_{exh}}\right) \le \left(\frac{2}{\gamma+1}\right)^{\frac{\gamma}{(\gamma-1)}}$$

-continued and $$f_2\left(\frac{P_{int}}{P_{exh}}\right) = \left(\frac{P_{int}}{P_{exh}}\right)^{\frac{1}{\gamma}}\left\{\frac{2\gamma}{\gamma-1}\left[1-\left(\frac{P_{int}}{P_{exh}}\right)^{\left(\frac{\gamma-1}{\gamma}\right)}\right]\right\}^{\frac{1}{2}}, \text{ when}$$

$$\left(\frac{P_{int}}{P_{exh}}\right) > \left(\frac{2}{\gamma+1}\right)^{\frac{\gamma}{(\gamma-1)}}$$

The first and second threshold pressures (TH1, TH2) of method 300 may have the same or different values depending on how a particular system has been calibrated. In one example, both the first and the second threshold pressure are about 5 kPa. After determining the engine operating characteristics in step 210, and determining a desired EGR flow in step 220, the effective flow area (CdA) of the EGR system can be determined based on the pressure characteristics of EQN 2 and correlated to a predetermined EGR valve 164 (or multiple valves) opened position based on the particular valve characteristics and the ΔP at step 332.

If the pressure differential (ΔP) between the exhaust pressure and the intake manifold pressure is greater than the first threshold pressure (TH1) (a "no" at step 322) and the ΔP across the EGR valve 164 is greater than the second threshold pressure (TH2) (a "no" at step 324), the EGR valve 164 metering method is determined based on operating in region A (FIG. 4) and the EGR valve position is determined at step 334 based on the same relationship between the EGR effective flow area (CdA) on a first side of EQN 2 to the pressure characteristic on the second side of EQN 2 as in step 332. However the EGR effective flow area (CdA) of step 334 is correlated to the EGR valve 164 position for the designed EGR system and system pressure, but without the EGR cooler (i.e. determined if EGR could flow from the junction 147 to EGR valve 164). Furthermore EQN2, and all related dependent equations would use $T_{EGR}$ and $P_{EGR}$ instead of $T_{exh}$ and $P_{exh}$, respectively. Thus modified EQN 2 would be:

$$CdA = \frac{\dot{m}_{egr}}{P_{EGR}f_1(T_{EGR})f_2\left(\frac{P_{int}}{P_{EGR}}\right)} \quad \text{EQN 2}$$

After the completion of either of steps 230, 332, or 334, the EGR valve is configured to the determined EGR valve position as described above with reference to method 200. The method 300 can then be repeated. It should be understood that method 300 can be modified such that either step 332 or step 334 can be eliminated along with step 324 such that the EGR valve 164 position is determined based on ΔP characteristics and any EGR effective flow area (CdA) when the ΔP between the exhaust pressure and the intake manifold is determined to be greater than the first threshold pressure (TH1).

Figure 6:
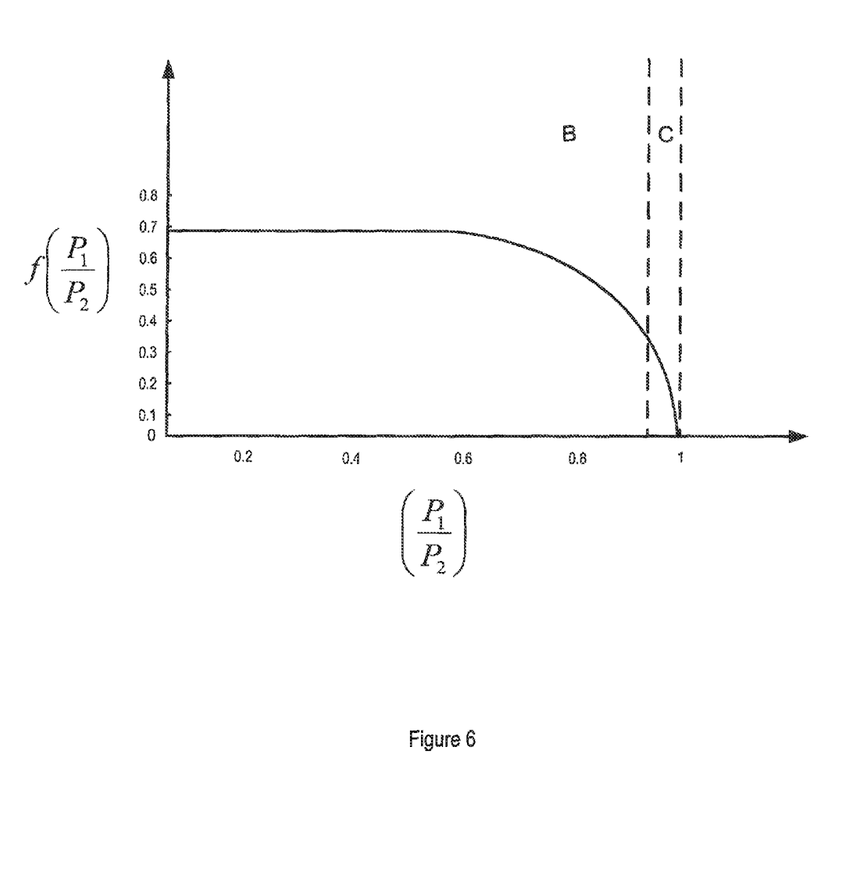
FIG. 6 is a graph showing various regions of operation according to the principles of the present disclosure.

For example, FIG. 4 shows a flowchart of a method 500 performed by the EGR control unit 170 for metering the position of EGR valve 164. Steps 210, 220, 230, and 240 are similar to those of like reference numbers described in reference to method 300 above. However, unlike method 300, method 500 does not include decision point 324. With reference to FIG. 6, there would also be no region A (FIG. 4) area of operation. Thus, if the pressure differential (ΔP) between the exhaust pressure and the intake manifold pressure is greater than the first threshold pressure (TH1) (a "no" at step 322), the EGR valve position is determined at step 532 based on the same relationship between the EGR effective flow area (CdA) on a first side of EQN 2 to the pressure characteristic on the second side of EQN 2 as in step 332 of method 300 (FIG. 3). After the EGR valve effective flow area (CdA) is determined, the EGR valve 164 opened position can be determined based on the pre-determined pressure differential (ΔP) correlation, as discussed above with reference to method 300. As can be seen, by using pipe flow characteristics to determine an EGR valve position, a more accurate EGR flow metering is established which enhances engine efficiency even at near zero differential pressures across the EGR valve.

What is claimed is:

1. A method of setting at least one exhaust gas recirculation (EGR) valve position for mixing EGR with intake air in an engine system comprising an engine, an EGR system including EGR piping, and at least one EGR valve and an air intake system including air intake piping, the method comprising:
    determining by a controller operating characteristics of the engine system;
    determining by the controller a desired EGR flow ratio based on the operating characteristics of the engine system;
    determining by the controller at least one EGR flow loss factor corresponding to the desired EGR flow ratio based on a relationship between the desired EGR flow and a pipe flow characteristic ratio;
    determining by the controller an EGR valve position using the at least one EGR flow loss factor; and
    configuring by the controller the EGR valve position to the determined EGR valve position,
    wherein the desired EGR flow ratio comprises the relationship of a flow rate of air to a flow rate of EGR,
    and the pipe flow characteristic ratio comprises a ratio of an EGR system characteristic to an air intake system characteristic.

2. The method of claim 1, wherein determining the operating characteristics of the engine system comprises evaluating one or more of an exhaust temperature, exhaust pressure, EGR pressure, intake manifold pressure, EGR temperature, intake airflow, engine rotation speed, engine throttle position, air intake valve position, pressure differential across the at least one EGR valve, intake manifold EGR fraction, desired air flow rate, and a demanded torque request.

3. The method of claim 1, wherein the EGR system characteristic comprises the square root of the sum of an EGR piping friction factor and the at least one EGR flow loss factor.

4. The method of claim 3, wherein each EGR flow loss factor includes a ratio of an area of the at least one EGR valve to an EGR system piping cross sectional area.

5. The method of claim 3, wherein the air intake system characteristic comprises the square root of the sum of an air intake piping friction factor and at least one air intake loss factor.

6. The method of claim 5, wherein each air intake loss factor includes a ratio of an air intake valve area to an air intake system piping cross sectional area.

7. The method of claim 5, wherein each of the air intake piping and the EGR piping friction factors comprise a system length, a system diameter, and a system friction coefficient corresponding to the respective air intake and EGR systems.

8. The method of claim 5, wherein determining the at least one EGR flow loss factor is further based on a piping diameter multiplier including a ratio of an EGR system piping diameter to an air intake system piping diameter.

9. The method of claim 7, wherein the at least one EGR flow loss factor is determined based on a relationship defined by an equation defined as:

$$\frac{Q_A}{Q_{EGR}} = \left(\frac{D_{INT}}{D_{EGR}}\right)^2 \frac{\sqrt{f_{EGR} L_{EGR} / D_{EGR} + \Sigma K_{EGR}}}{\sqrt{f_{INT} L_{INT} / D_{INT} + \Sigma K_{INT}}}$$

wherein $Q_A$ is the flow rate of air, $Q_{EGR}$ is the flow rate of EGR, $D_{EGR}$ is the EGR system piping diameter, $f_{EGR}$ is the EGR system friction coefficient, $L_{EGR}$ is the EGR system piping length, $D_{INT}$ is the air intake system piping diameter, $f_{INT}$ is the intake system friction coefficient, $L_{INT}$ is the intake system piping length, $\Sigma K_{EGR}$ is a summation of each EGR flow loss factor $K_{EGR}$ associated with each at least one EGR valve and is defined as:

$$K_{EGR} = \left(1 - \frac{A_{EGR}}{A_{EGR\_pipe}}\right)^2,$$

wherein $A_{EGR}$ is the area of the respective EGR valve and $A_{EGR\_pipe}$ is the EGR system piping cross sectional area, and $\Sigma K_{INT}$ is a summation of each intake loss factor $K_{INT}$ associated with at least one respective air intake valve and is defined as:

$$K_{INT} = \left(1 - \frac{A_{Ivalue}}{A_{Ipipe}}\right),$$

wherein $A_{Ivalve}$ is an area of the respective air intake valve and $A_{Ipipe}$ is an air system piping cross sectional area.

10. The method of claim 2, wherein the EGR valve position is determined using the at least one EGR flow loss factor when the absolute value of the difference between the exhaust pressure and the intake manifold pressure is less than or equal to a first threshold pressure, and when the absolute value of the difference between the exhaust pressure and the intake manifold pressure is greater than the first threshold pressure, the EGR valve position is determined using a relationship of an EGR effective flow area to a pressure ratio relating the intake manifold pressure to a pressure, the pressure comprising at least one of the exhaust pressure and the EGR pressure.

11. The method of claim 10, wherein the EGR effective flow area includes the effective flow area of the EGR cooler when the absolute value of the change in pressure across the at least one EGR valve is less than or equal to a second threshold pressure.

12. The method of claim 10, wherein the relationship of the EGR effective flow area to the pressure ratio relating the intake manifold pressure to the exhaust pressure is represented by an equation defined as:

$$CdA = \frac{\dot{m}_{egr}}{P \cdot f_1(T) f_2\left(\frac{P_{int}}{P}\right)},$$

wherein CdA is the EGR effective flow area, $\dot{m}_{egr}$ is the desired mass flow rate of EGR, P is the pressure comprising at least one of the exhaust pressure and the EGR pressure, T is a temperature comprising at least one of the exhaust temperature and the EGR temperature, $f_1(T)$ is a function dependent on the temperature, and $$f_2\left(\frac{P_{int}}{P}\right)$$

is a function dependent on intake manifold pressure $P_{int}$, and the pressure P,
wherein $$f_1 = \frac{1}{\sqrt{RT}}$$

and $R_{exh}$ is a gas constant for at least one of the exhaust gases and the EGR gases, $$f_2\left(\frac{P_{int}}{P}\right) = \gamma^{\frac{1}{2}} \left(\frac{2}{\gamma+1}\right)^{\left(\frac{\gamma+1}{2(\gamma-1)}\right)},$$

when $$\left(\frac{P_{int}}{P}\right) \le \left(\frac{2}{\gamma+1}\right)^{\frac{\gamma}{(\gamma-1)}}$$

and $$f_2\left(\frac{P_{int}}{P}\right) = \left(\frac{P_{int}}{P}\right)^{\frac{1}{\gamma}} \left\{ \frac{2\gamma}{\gamma-1} \left[1 - \left(\frac{P_{int}}{P}\right)^{\left(\frac{\gamma-1}{\gamma}\right)}\right]\right\}^{\frac{1}{2}},$$

when $$\left(\frac{P_{int}}{P}\right) > \left(\frac{2}{\gamma+1}\right)^{\frac{\gamma}{(\gamma-1)}},$$

wherein $\gamma$ is the ratio of specific heats $$\left(\frac{C_p}{C_v}\right)$$

of the cooled EGR.

13. The method of claim 11, where in the first and second threshold pressure is about 5 kPa.

14. An engine system comprising:
an engine;
an EGR system including EGR piping and at least one EGR valve;
an air intake system including air intake piping;
a plurality of sensors for sensing characteristics of the engine system; and
an EGR control unit comprising a processor connected to receive the sensed characteristics of the engine system, wherein the processor is configured to:
determine operating characteristics of the engine system;
determine a desired EGR flow ratio based on the engine system characteristics;
determine at least one EGR flow loss factor corresponding to the desired EGR flow ratio based on a relationship between the desired EGR flow ratio and a pipe flow characteristic ratio;
determine at least one EGR valve position using the at least one EGR flow loss factor; and
configure the at least one EGR valve position to the determined EGR valve position,
wherein the desired EGR flow ratio comprises the relationship of a flow rate of air to a flow rate of EGR, and the pipe flow characteristic ratio comprises a ratio of an EGR system characteristic to an air intake system characteristic.

15. The engine system of claim 14, wherein the operating characteristics of the engine system are determined by evaluating one or more of an exhaust temperature, exhaust pressure, EGR temperature, EGR pressure, intake manifold pressure, intake airflow, engine rotation speed, engine throttle position, air intake valve position, pressure differential across the at least one EGR valve, intake manifold EGR fraction, desired air flow rate, and a demanded torque request.

16. The engine system of claim 14, wherein the at least one EGR flow loss factor is further based on a piping diameter multiplier including a ratio of an EGR system piping diameter to an air intake system piping diameter, the EGR system characteristic comprises the square root of the sum of an EGR piping friction factor and the at least one EGR flow loss factor, each EGR flow loss factor includes a ratio of an area of the at least one EGR valve to an EGR system piping cross sectional area, and the air intake system characteristic comprises the square root of the sum of an air intake piping friction factor and at least one air intake loss factor, wherein each air intake loss factor includes a ratio of an air intake valve area to an air intake system piping cross sectional area, and each of the air intake piping and the EGR piping friction factors comprise a system length, a system diameter, and a system friction coefficient corresponding to the respective air intake and EGR systems.

17. The engine system of claim 16, wherein the at least one EGR flow loss factor is determined based on a relationship defined by an equation defined as:

$$\frac{Q_A}{Q_{EGR}} = \left(\frac{D_{INT}}{D_{EGR}}\right)^2 \frac{\sqrt{f_{EGR} L_{EGR} / D_{EGR} + \Sigma K_{EGR}}}{\sqrt{f_{INT} L_{INT} / D_{INT} + \Sigma K_{INT}}}$$

wherein $Q_A$ is the flow rate of air, $Q_{EGR}$ is the flow rate of EGR, $D_{EGR}$ is the EGR system piping diameter, $f_{EGR}$ is the EGR system friction coefficient, $L_{EGR}$ is the EGR system piping length, $D_{INT}$ is the air intake system piping diameter, $f_{INT}$ is the intake system friction coefficient, $L_{INT}$ is the intake system piping length, $\Sigma K_{EGR}$ is a summation of each EGR flow loss factor $K_{EGR}$ associated with each at least one EGR valve and is defined as:

$$K_{EGR} = \left(1 - \frac{A_{EGR}}{A_{EGR\_pipe}}\right)^2,$$

wherein $A_{EGR}$ is the area of the respective EGR valve and $A_{EGR\_pipe}$ is the EGR system piping cross sectional area, and $\Sigma K_{INT}$ is a summation of each intake loss factor associated with at least one respective air intake valve and is defined as:

$$K_{INT} = \left(1 - \frac{A_{Ivalve}}{A_{Ipipe}}\right)^2,$$

wherein $A_{Ivalve}$ is an area of the respective air intake valve and $A_{Ipipe}$ is an air system piping cross sectional area.

18. The system of claim 15, wherein the processor is configured to determine the EGR valve position using the at least one EGR flow loss factor when the absolute value of the difference between the exhaust pressure and the intake manifold pressure is less than or equal to a first threshold pressure, and when the absolute value of the difference between the exhaust pressure and the intake manifold pressure is greater than the first threshold pressure, the processor is configured to determine the EGR valve position using a relationship of an EGR effective flow area to a pressure ratio relating the intake manifold pressure to a pressure, the pressure comprising at least one of the exhaust pressure and the EGR pressure.

19. The engine system of claim 18, wherein the EGR effective flow area includes the effective flow area of the EGR cooler when the absolute value of the change in pressure across the at least one EGR valve is less than or equal to a second threshold pressure.

20. The engine system of claim 18, wherein the relationship of the EGR effective flow area to the pressure ratio relating the intake manifold pressure to the pressure is represented by an equation defined as:

$$CdA = \frac{\dot{m}_{egr}}{P \cdot f_1(T) f_2\left(\frac{P_{int}}{P}\right)},$$

wherein CdA is the EGR effective flow area, $\dot{m}_{egr}$ is the mass flow rate of EGR, P is the pressure comprising at least one of the exhaust pressure and the EGR pressure, T is a temperature comprising at least one of the exhaust temperature and the EGR temperature, $f_1(T)$ is a function dependent on the temperature, and $$f_2\left(\frac{P_{int}}{P}\right)$$

is a function dependent on intake manifold pressure $P_{int}$, and the pressure,
wherein $$f_1 = \frac{1}{\sqrt{RT}}$$

and R is a gas constant for at least one of the exhaust gases and the EGR gases, $$f_2\left(\frac{P_{int}}{P}\right) = \gamma^{\frac{1}{2}} \left(\frac{2}{\gamma+1}\right)^{\left(\frac{\gamma+1}{2(\gamma-1)}\right)},$$

when $$\left(\frac{P_{int}}{P}\right) \le \left(\frac{2}{\gamma+1}\right)^{\frac{\gamma}{(\gamma-1)}}$$

and $$f_2\left(\frac{P_{int}}{P}\right) = \left(\frac{P_{int}}{P}\right)^{\frac{1}{\gamma}} \left\{\frac{2\gamma}{\gamma-1}\left[1-\left(\frac{P_{int}}{P}\right)^{\left(\frac{\gamma-1}{\gamma}\right)}\right]\right\}^{\frac{1}{2}},$$

when $$\left(\frac{P_{int}}{P}\right) > \left(\frac{2}{\gamma+1}\right)^{\frac{\gamma}{(\gamma-1)}},$$

wherein $\gamma$ is the ratio of specific heats $$\left(\frac{C_p}{C_v}\right)$$

of the cooled EGR.

* * * * *